United States Patent [19]

Kamiya et al.

[11] 4,092,133
[45] May 30, 1978

[54] PROCESS AND APPARATUS FOR TREATING A WASTE GAS INCLUDING COMBUSTIBLE GASES AND RADIOACTIVE KR-85

[75] Inventors: Kunio Kamiya, Hitachi; Hideo Yusa, Katsuta; Hiroyuki Tsuchiya, Hitachi, all of Japan

[73] Assignee: Hitachi, Ltd., Japan

[21] Appl. No.: 651,534

[22] Filed: Jan. 22, 1976

[30] Foreign Application Priority Data

Jan. 27, 1975 Japan .................... 50-10477

[51] Int. Cl.² .......................... B01D 15/06
[52] U.S. Cl. ........................... 55/62; 55/74; 55/179; 55/208; 55/269; 55/387; 62/18
[58] Field of Search .............. 23/260; 55/62, 66, 74, 55/179, 208, 269, 387; 62/17, 18; 423/245, 262

[56] References Cited

U.S. PATENT DOCUMENTS

| | | | |
|---|---|---|---|
| 2,793,507 | 5/1957 | Hnilicka | 55/66 X |
| 3,343,916 | 9/1967 | Cahn et al. | 55/62 X |
| 3,425,792 | 2/1969 | Stephens | 423/245 X |
| 3,445,990 | 5/1969 | Hays et al. | 55/66 X |
| 3,513,631 | 5/1970 | Seibert et al. | 55/62 X |
| 3,806,583 | 4/1974 | Dewell | 55/66 X |
| 3,922,150 | 11/1975 | Yusa et al. | 55/66 X |
| 3,944,646 | 3/1976 | Martin | 423/262 X |

OTHER PUBLICATIONS

Steinberg et al., Recovery of Fission Product Noble Gases, 1/1959, Ind. & Eng. Chem., vol. 51, No. 1, pp. 47-50.

Primary Examiner—Frank A. Spear, Jr.
Assistant Examiner—Robert H. Spitzer
Attorney, Agent, or Firm—Craig & Antonelli

[57] ABSTRACT

Hydrocarbons are removed from a waste gas including oxygen, hydrocarbons and radioactive Krypton-85 (hereinafter referred to as "Kr-85"), which is generated in a nuclear reactor and a fuel recycling plant without adopting the reduction method of oxygen by adding hydrogen; the resultant gas is caused to pass through an activated charcoal layer and Kr-85 is adsorbed to the activated charcoal layer; the rest of gas is discharged to the atmosphere; further oxygen remaining in the activated charcoal layer is returned to a process of removing hydrocarbons; and thereafter Kr-85 adsorbed to the activated charcoal layer is desorbed, condensed and recovered.

7 Claims, 1 Drawing Figure

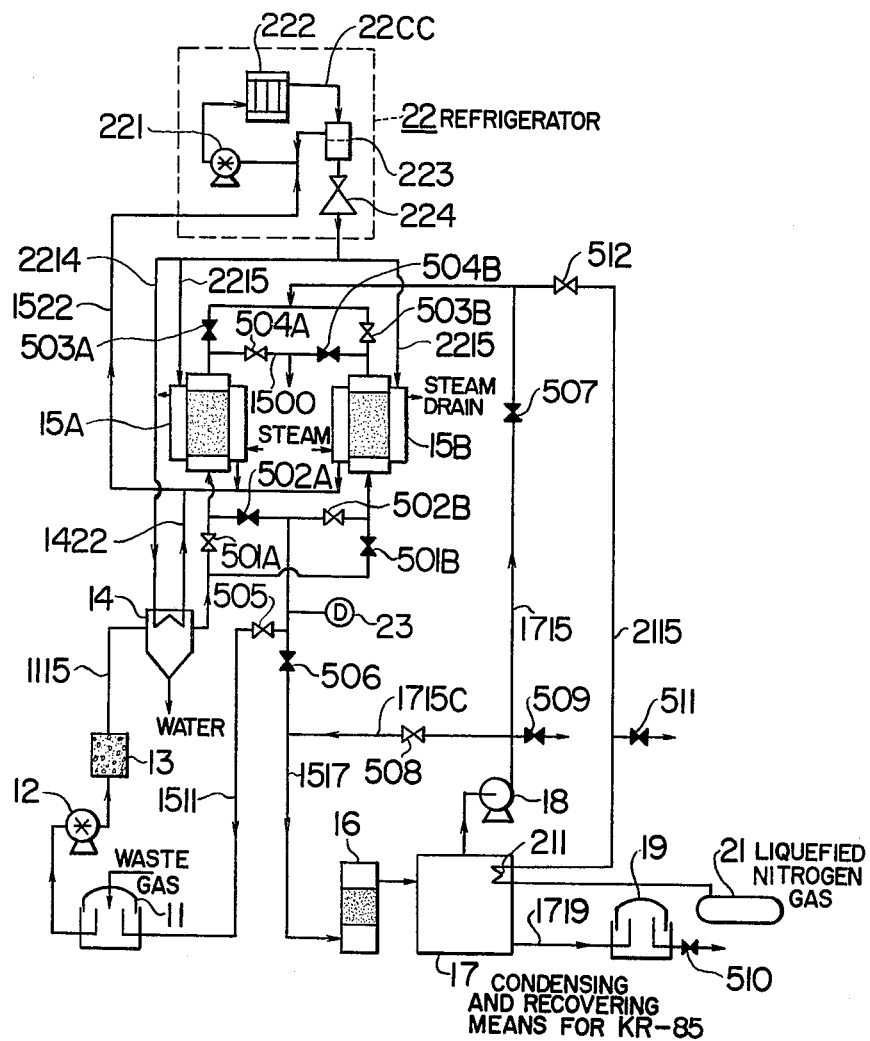

PROCESS AND APPARATUS FOR TREATING A WASTE GAS INCLUDING COMBUSTIBLE GASES AND RADIOACTIVE KR-85

BACKGROUND OF THE INVENTION

This invention relates to the treatment of a combustible gas containing radioactive Kr-85, which is generated in a nuclear reactor and a fuel recycling plant.

One of the methods of separating and recovering Kr-85 from a gas containing Kr-85, fission product gas, which is generated in a nuclear power plant or the like is the cryogenic distillation method including a distillation column wherein the gas is treated by a cryogenic distillation processing and the contained gases are separated by the utilization of the differences in boiling point. In the case of seperating and recovering Kr-85 by said cryogenic distillation method, oxygen which might be contained in the gas would be condensed with acetylene generated during the cryogenic distillation processing, and have a danger of catching fire and exploding because of such an inflammable source as static electricity.

Heretofore, a following measure has been taken to solve the above problem. That is, firstly, hydrocarbons such as acetylene are removed from the waste gas by burning; thereafter oxygen contained in the gas is diluted; hydrogen is added to the gas and said oxygen is reduced to water while passing through the medium of molecular sieves; thereafter solid impurities such as dusts are removed; a part of the gas after the removal of the impurities is circulated as a diluent gas for the oxygen; the rest of the gas is used for adsorbing and separating Kr-85 in a Kr-85 separating, recovering means packed therein with activated charcoal; the clean gas after the separation is discharged to the atmosphere; and the rest of the gas containing Kr-85, afer discharging, is recovered to a storage vessel after condensation.

However, the waste gas from a nuclear reactor and a fuel recycling plant normally contains 20 to 50% oxygen, and the following problems are presented in the case of removing said oxygen by the conventional reduction method of oxygen by adding hydrogen.

1. Consumption of hydrogen is increased and cost of operation is extremely high. (For example, when a waste gas containing oxygen of 50% concentration is treated by 25 Nm$^3$/h, hydrogen consumption reaches 600 Nm$^3$/h.)

2. The addition of hydrogen and control in the dilution of oxygen are difficult, particularly the stabilities are low with respect to gas flow rate and with respect to the fluctuation in concentration of oxygen after the removal of hydrogen by the reduction of oxygen, and there usually exists a danger of the explosion of hydrogen due to a possible error in operation.

3. As the flow rate of the circulating gas for diluting oxygen amounts of 10 to 25 times the flow rate of the gas to be treated, the volume of the equipment becomes extremely larger.

SUMMARY OF THE INVENTION

The object of the present invention resides in the following items of removing oxygen by utilizing the difference in the adsorption characteristics for active charcoal between Kr-85 and oxygen without reducing and removing oxygen by adding hydrogen.

1. To decrease the running cost and equipment cost due to the addition of hydrogen to a considerable extent.

2. To be freed from the difficulties in control of adding of hydrogen, in dilution of oxygen and the like, and eliminate the danger of the explosion of hydrogen due to the difficulties.

One feature of the present invention resides in the method wherein, in the case of treating a gas containing oxygen, hydrocarbons and radioactive Kr-85, firstly, hydrocarbons are removed by burning; the rest of the gas is caused to pass through an activated charcoal layer and Kr-85 is adsorbed to the activated charcoal layer; further, the remaining gas containing oxygen is discharged to the atmosphere; thereafter the gas remaining in the activated charcoal layer is returned to the process for removing hydrocarbons; thereafter Kr-85 adsorbed to the activated charcoal layer is desorbed; and thereafter Kr-85 is subjected to the treatments of condensation and recovery.

Another feature of the present invention resides in that the treatments of condensation and recovery to which Kr-85 desorbed from the activated charcoal layer is subjected are isolated during bypassing the desorbed gas through a bypass pipe line so that the treatments can be effected independently of the hydrocarbon removing process, the Kr-85 adsorbing process, the process of discharging oxygen and the returning process for the gas remaining in the activated charcoal.

BRIEF DESCRIPTION OF THE DRAWING

The drawing is a flow chart showing an embodiment of the present invention.

DESCRIPTION OF THE PREFERRED EMBODIMENT

In this system embodying the present invention, a fission product gas Kr-85 contained in a waste gas is readily adsorbed and adsorption towers 15A and 15B packed therein with an adsorbent for Kr-85 not adsorbing oxygen well, such as activated charcoal, are provided in parallel with the flow of the waste gas. Said adsorption towers 15A and 15B are provided each with cooling means for facilitating adsorption. That is, a refrigerant is supplied through a refrigerator 22 to the towers to cool the towers from outside. Additionally, the towers are provided with an external heating means using steam or an electric heater (not shown) or the like for facilitating desorption of Kr-85 and the like having been adsorbed.

Provided on the gas inlet piping lines of the adsorption towers 15A and 15B are valves 501A and 501B, respectively. Provided on gas outlet piping lines of said towers are valves 503A and 503B, respectively. Provided at the intermediate portions of said gas outlet piping lines is a piping line 1500 for discharging gas freed of Kr-85 to the atmosphere, on which valves 504A and 504B are also provided, respectively.

Connecting piping line respectively provided with valves 502A and 502B connects both of the gas inlet piping lines; connected to the connecting piping line, at a position between the valve 502A and 502B, is a piping line 1517 provided with an oxygen analyzer 23, a valve 506, Kr-85 condensing means 16 and Kr-85 recovering means 17 in series; connected to the gas outlet piping lines of the adsorption towers 15A and 15B is a piping line 1715 provided with a valve 507, a circulating blower 18 and the Kr-85 recovering means, in series, thereby forming a closed circuit. In this closed circuit, there is provided a by-pass piping line 1715C being connected at one end to a piping line 1715 disposed at a position between the circulating blower 18 and the valve 507 at the other end to a piping line 1517 disposed at the position between the Kr-85 condensing means 16, and the valve 506 and having valve 508.

Additionally, led out from a liquefied nitrogen gas tank 21, forming a cooler 211 at a part of the Kr-85 recovering means 17, and connected to the gas outlet piping lines is a piping line 2115 with a drain valve 511 and a valve 512.

On the other hand, a return piping line 1511 with a valve 505 is connected at one end to the piping line 1517 disposed at a position between the oxygen analysis meter 23 and the valve 506, and at the other end to a treated gas buffer tank 11. Led out from said treated gas buffer tank 11 and connected to the gas inlet piping lines is a piping line 1115 provided therein from said gas buffer tank 11 with a compressor 12, a hydrocarbon remover 13 and a dehumidifier 14 in the order.

The refrigerator 22 comprises a closed refrigerant circuit 22CC being connected to a compressor 221, a condenser 222 and liquid receiver 223, and an expansion valve 224 being connected by a pipe to said liquid receiver 223. One end of the refrigerant feed piping line 2215 is connected to the expansion valve 224, and the other ends to each of the cooling means of the adsorption towers 15A and 15B. One end of a refrigerant feed piping line 2214 is connected to the expansion valve 224, and the other end to the dehumidifier 14.

One end of a refrigerant return piping line 1522 is connected to the refrigerator 22 and the other ends to each of the cooling means of the adsorption towers 15A and 15B and to the dehumidifier 14.

A piping line 1719 is provided from the Kr-85 recovering means 17 to a Kr-85 storage tank 19 which is provided with a Kr-85 drawing-out valve 510.

Description will hereunder be given of the operation of the present invention.

(1) First Phase

The adsorption tower 15A and the dehumidifier 14 are cooled to the predetermined temperature by the refrigerator 22, and the valves 501A and 504A are opened and the others are closed, thereafter, when a waste gas including oxygen, hydrocarbons and Kr-85 is fed to the treated gas buffer tank 11, said gas flows through the compressor 12 into the hydrocarbon remover 13 where hydrocarbons contained in the gas is burnt by the aid of red heated platinum catalizer, cooled in the dehumidifier 14 and the water vapor generated by the burning of hydrocarbons is condensed and removed out of the dehumidifier. Next, the gas thus dehumidified is caused to flow through the valve 501A into the adsorption tower 15A. The gas passed through the activated charcoal layer of the adsorption tower 15A until Kr-85 in the gas reaches the break through point and thereafter one part, i.e. most of the oxygen contained in the gas is discharged to the atmosphere through the valve 504A, and another part of the oxygen contained in the gas remains in the activated charcoal layer in the adsorption tower 15A.

Here, the break through time of Kr-85 and the remaining quantity of oxygen are determined by the flow rate of the dehumidified gas, the quantity of the activated charcoal and the temperature of the activated charcoal.

Now, if the quantity of activated charcoal is 1 ton and the temperature of activated charcoal is $-70°$ C, in the case of the flow rate of the dehumidified gas being 25 $Nm^3/h$ the break through time of Kr-85 will be 30 hours because the flow rate of the dehumidified gas per ton of activated charcoal is designed to be 750 $Nm^3$ as viewed from the break-through thereof. On the other hand, if the concentration of oxygen contained in the dehumidified gas is 50%, the quantity of oxygen contained in the gas which is passed through during the abovementioned 30 hours will be 375 $Nm^3$. In this case, the quantity of oxygen adsorbed to the activated charcoal amounts to 18 $Nm^3$/ton, and if the quantity of oxygen previously existing in the space portions of the packed layer of the adsorption tower 15A is added thereto, then the quantity of the remaining oxygen will amount to approx. 20 $Nm^3$. As viewed from the quantity of aerated oxygen and the quantity of oxygen remaining in the adsorption tower 15A, approx. 95% $[(375 - 20)/375 \approx 0.95]$ or oxygen is to be removed at the time of break-through of Kr-85.

(2) Second Phase

Now, Kr-85 adsorbed and held in the adsorption tower 15A is caused to return the oxygen contained therein through the valve 502A, 505 and the piping line 1511 to the gas buffer tank 11 through the agency of the liquefied nitrogen gas fed from the liquefied nitrogen gas tank 21 through the piping line 2115.

At the same time, the dehumidifeid gas is caused to flow through the valve 501B into the adsorption tower 15B and the oxygen gas freed of Kr-85 is finally discharged to the atmosphere in the same manner as described for the adsorption tower 15A in the first phase, while the Kr-85 condensing means 16 and the Kr-85 recovering means 17 are isolated during recycling the desorbed Kr-85 gas through the bypass piping line 1715C.

(3) Third Phase

The feeding of refrigerant to the adsorption tower 15A is stopped, and steam is caused to pass around the adsorption tower.

The valves 501B, 502A, 503A, 504B, 507 and 512 are opened and the others are closed.

The gas containing the desorbed Kr-85 is fed from the adsorption tower 15A through the piping line 1517 to the Kr-85 condensing means 16.

Then, the gas further passes through the Kr-85 recovering means 17, the circulating blower 18 and the piping line 1715.

(4) Fourth Phase

The steam feeding is stopped and the adsorption tower 15A is cooled again by the refrigerator 22.

The valves 501A, 502B, 503B, 504A, 505, 508 and 512 are opened and the others are closed.

There occurs, in this phase, the same processing as in the second phase except for the operation to exchange the adsorption tower 15A for the adsorption tower 15B.

(5) Fifth Phase

The cooling is stopped and the steam is fed again to the adsorption tower 15B.

The valves 501A, 502B, 503B, 504A, 506, 507, and 512 are opened and the others are closed.

There occurs, in this phase, the same processing as in the Third Phase except for the operation to exchange the adsorption tower 15A for the adsorption tower 15B.

After the Fifth Phase, operation of the Second Phase to the Fifth Phase repeatedly goes on.

In these phases, valves are omitted in the drawing in the refrigerant feed piping lines 2214 and 2215 and in the refrigerant return piping lines 1422 and 1522. Nitrogen gas is discharged to the atmosphere with the oxygen in the Kr-85 adsorption phase.

Desorbing operation of the remaining oxygen adsorbed to the adsorption tower 15B is effected at the same time as the next adsorption of the waste gas to the adsorption tower 15A by opening the valves 512, 503B, 502B and 505 as shown in the drawing. During the time of desorption of the remaining oxygen as well, by closing the valves 506 and 507 and opening the valve 508 a circuit independent from adsorpbing and desorbing operations of the adsorption towers 15A and 15B is formed, which passes through the by-pass piping line 1715C, the closed circuit 1517, the Kr-85 condensing means 16, the Kr-85 recovering means 17 and the circulating blower 18, and condensing and recovering of Kr-85 can be continuously effected without interrupting said means described.

In this embodiment, Kr-85 can be desorbed in a short time with a relatively small quantity of nitrogen gas by lowering the adsorptivity of Kr-85 adsorbed to the activated charcoal through heating the adsorption towers 15A and 15B by a steam jacket, for example. Here, if the temperatures of the adsorption towers are elevated to $-20°$ C, the time required for adsorption will be approx. 20 hours at the flow rate of 12.5 $Nm^3/h$ and under the same conditions as described above.

In order to continue the change-over operation of the adsorption towers 15A and 15B, it is necessary to select properly the flow rate of nitrogen gas for desorbing Kr-85 and for returning the gas containing oxygen from the adsorption towers to the treated gas buffer tank II and the temperature of the charcoal layer during the adsorption and desorption of Kr-85.

In the embodiment of the present invention, liquefied nitrogen gas was used as the desorbing gas for part of oxygen and Kr-85 but the concept of the present invention is not limited to this type, and it is possible that an inactive gas composed of a mono-element such as He, Ne or Ar be used.

What is claimed is:

1. A process for treating a waste gas including oxygen, hydrocarbons and radioactive Kr-85 prior to condensing and recovering Kr-85 from said waste gas which comprises the steps of:
   removing the hydrocarbons in the waste gas to produce a treated waste gas free of hydrocarbons,
   passing the treated waste gas to one of two charcoal layers cooled to a temperature to promote selective adsorption of Kr-85.
   adsorbing the Kr-85 and a portion of the oxygen in the treated waste gas in said one charcoal layer,
   discharging a gas containing the remaining portion of oxygen in said treated waste gas from said one charcoal layer to the atmosphere until the one charcoal layer is saturated with Kr-85,
   introducing a cooled mono-element gas into said one charcoal layer to purge the portion of oxygen adsorbed therein and
   desorbing Kr-85 from the one charcoal layer by heating the one charcoal layer and by continuing to introduce the cooled mono-element gas to the one charcoal layer; the other charcoal layer undergoing the same cyclic operation as the one charcoal layer with the steps of introducing a cooled mono-element gas and of desorbing Kr-85 occurring in the other charcoal layer while the steps of passing the treated gas, of adsorbing the Kr-85 and the portion of oxygen and of discharging a gas containing the remaining portion of oxygen occur in the one charcoal layer.

2. A process according to claim 1, further comprising passing the Kr-85 desorbed from the one charcoal layer to a condensing and recovery unit.

3. A process according to claim 1, wherein said hydrocarbons in the waste gas are removed in a first waste gas treatment stage and said process further comprising introducing the cooled mono-element gas and the oxygen purged from said one charcoal layer into said treatment stage together with waste gas from which hydrocarbons are to be removed.

4. An apparatus for treating a waste gas containing oxygen, hydrocarbons, and Kr-85 which comprises:
   two charcoal packed adsorption towers for adsorbing the Kr-85 contained in said waste gas,
   means for heating and cooling charcoal within said adsorption towers during desorption and adsorption of said Kr-85,
   a first gas treatment means for removing the hydrocarbons in said waste gas,
   means for introducing the treated waste gas freed of hydrocarbons from said gas treating means into one end of one of said adsorption towers,
   means connected at the other end of said adsorption tower for discharging a gas freed of Kr-85 exiting from said one adsorption tower to the atmosphere,
   means connected to the one end of said one adsorption tower for feeding an inert gas composed of a mono-element to said one adsorption tower, when the discharge means are disconnected,
   a first closed circuit for connecting said gas treatment means with said one end of said adsorption tower when the inert gas is fed into the other end of said one adsorption tower and said one adsorption tower is being cooled to return oxygen to said treatment means,
   a second closed circuit for connecting one end of said one adsorption tower to a means for condensing and recovering Kr-85,
   valve means for interconnecting said second closed circuit to said one end of said one adsorption tower when inert gas is fed into the other end of said one adsorption tower and heat is applied to said charcoal within said one adsorption tower whereby the Kr-85 is desorbed from said one adsorption tower and is introduced into said means for condensing and recovering said Kr-85, and
   means for connecting the means for introducing the treated waste gas, the means for discharging the gas freed of Kr-85, the first closed circuit, the second closed circuit and the valve means to the other adsorption tower whereby said other adsorption tower will go through the same cycle of operation as the first adsorption tower.

5. An apparatus according to claim 4, wherein said second closed circuit includes a by-pass line for connecting an outlet of the means for condensing and recovering said Kr-85 with an inlet of said means for condensing and recovering Kr-85.

6. An apparatus for treating a waste gas containing oxygen, hydrocarbons and Kr-85, which comprises:
two charcoal packed adsorption towers,
means for heating and cooling the charcoal in said adsorption towers, to desorb and to adsorb said Kr-85,
means for removing the hydrocarbons in said waste gas by burning the hydrocarbons in the presence of a heated platinum catalyst,
condensing means connected to said means for removing said hydrocarbons for removing vapor generated during burning of said hydrocarbons,
means connected to said condensing means for feeding the gas received from the condensing means to one end of one of said adsorption towers,
means connected to the other end of said one adsorption tower for discharging a gas containing oxygen and being free of Kr-85 from said one adsorption tower into the atmosphere,
means for stopping the discharge of gas from the other end of said one adsorption tower,
means for gasifying liquid nitrogen,
means connected to the other end of said adsorption tower for introducing the nitrogen gas into said one adsorption tower to purge oxygen and Kr-85 adsorbed by the charcoal in said adsorption tower,
a first closed circuit adapted to be connected to said one end of said one adsorption tower and to said means for removing hydrocarbons from said waste gas, said first closed circuit including valve means for allowing oxygen and said nitrogen gas to enter into said means for removing hydrocarbons to thereby facilitate burning of said hydrocarbons,
a second closed circuit adapted to be connected to one end of said one adsorption tower during desorption of said Kr-85 and to means for condensing and recovering said desorbed Kr-85, said second closed circuit including valve means for allowing entry of said desorbed Kr-85 after desorption of the oxygen contained in the charcoal in said one adsorption tower and duing heating of said charcoal and
means for connecting the means for feeding the gas received from the condensing means, the means for discharging a gas containing oxygen and being free of Kr-85, the means for stopping discharge of gas, the means for introducing the nitrogen gas, the first closed circuit and the second closed circuit to the other adsorption tower whereby said other adsorption tower will go through the same cycle of operation as the first adsorption tower.

7. The apparatus of claim 6, wherein said second closed circuit further includes a by-pass for allowing recycling of recovered Kr-85 within said means for condensing and recovering said Kr-85.

* * * * *